W. H. WATERMAN.
STEERING DEVICE FOR TRACTORS.
APPLICATION FILED SEPT. 21, 1912.
1,096,974.
Patented May 19, 1914.
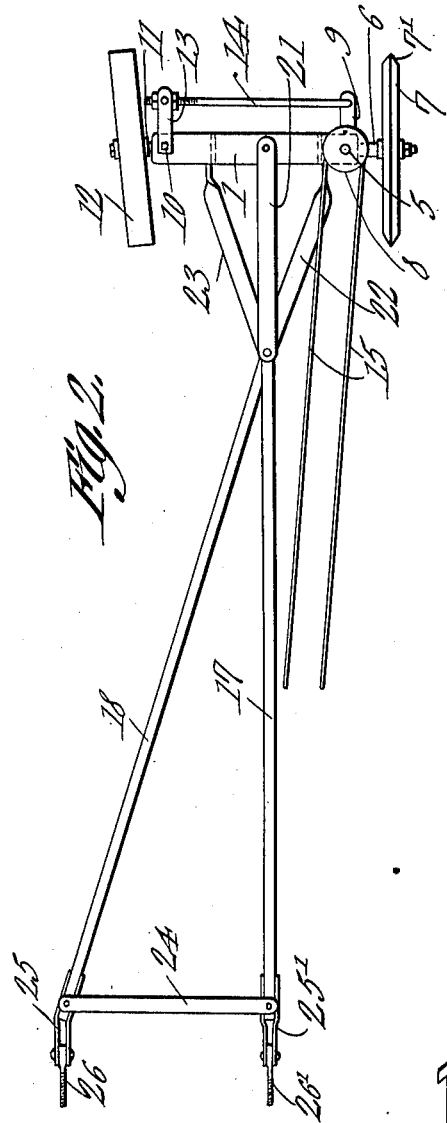
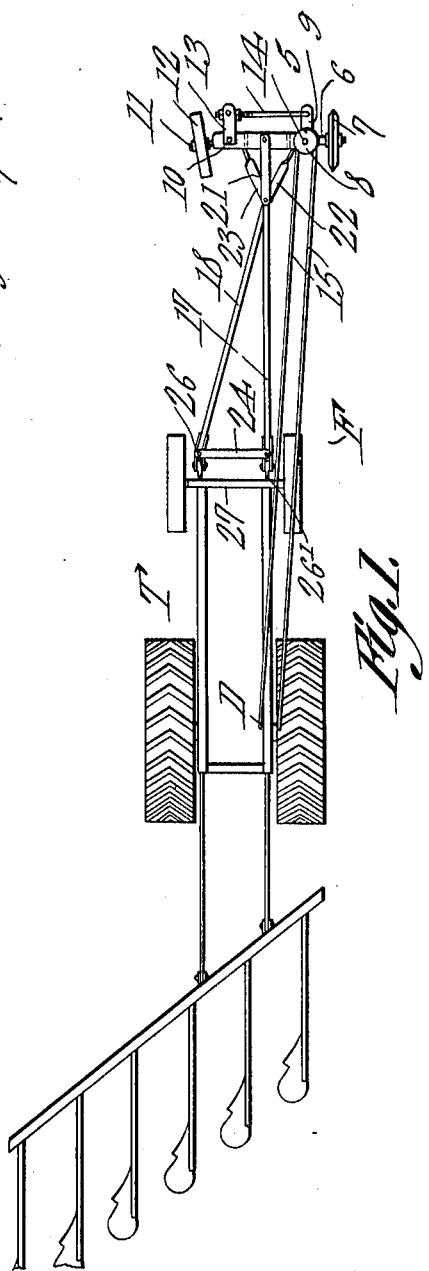
William Henry Waterman,
Inventor

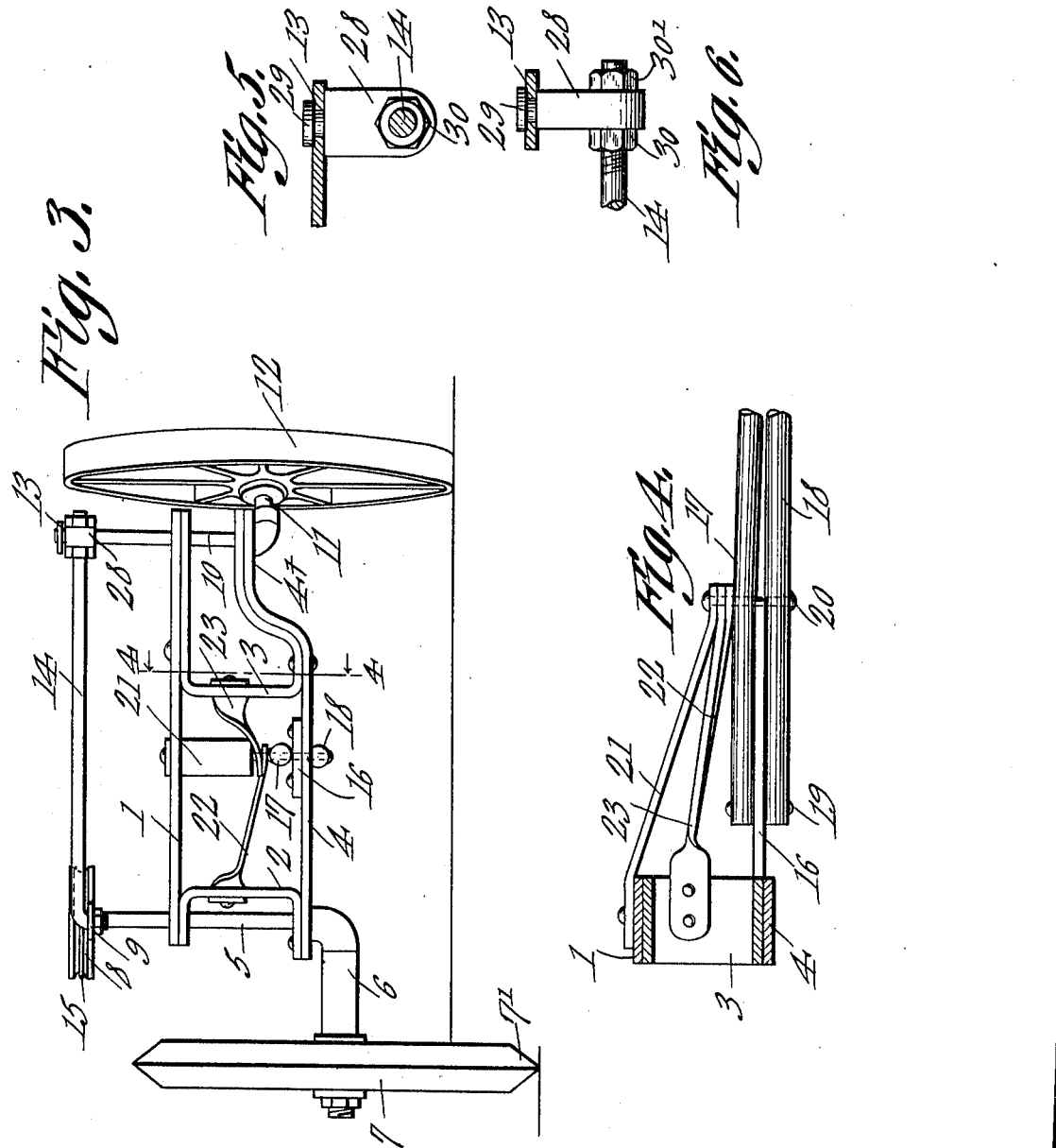

UNITED STATES PATENT OFFICE.

WILLIAM HENRY WATERMAN, OF BIGSPRING, NEBRASKA.

STEERING DEVICE FOR TRACTORS.

1,096,974.  Specification of Letters Patent.  Patented May 19, 1914.

Application filed September 21, 1912.  Serial No. 721,643.

*To all whom it may concern:*

Be it known that I, WILLIAM HENRY WATERMAN, a citizen of the United States, residing at Bigspring, in the county of Deuel and State of Nebraska, have invented a new and useful Steering Device for Tractors, of which the following is a specification.

The present invention relates to improvements in steering devices for tractors, the primary object of the invention being the provision of a novel pilot steering mechanism adapted to be projected forwardly of the front and steering axle of the tractor, and provided with a furrow engaging wheel and a canted land engaging wheel, said wheels being coupled together and actuating a mechanism connected to the steering drum of the tractor whereby the coaction of the furrow engaging and land wheels will operate the tractor steering drum to automatically steer the tractor during the plowing operation.

A further object of the present invention is the provision of a novel form of steering device for tractors, which is readily attached to the forward axle of any form of tractor, and in which the furrow wheel will be held in engagement with the land side of the furrow by means of a canted land engaging wheel, the two wheels being connected together, and operably connected to the steering drum of the tractor, so that the furrow will actuate the wheels to automatically guide the tractor during the plowing operation, the canting of the land wheel tending at all times to hold the furrow wheel against the land side of the furrow and thus insure the proper position of the furrow wheel even though the same may be momentarily jerked from such position due to inequalities of the land.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view in diagram showing the steering device applied to a tractor pulling a gang plow. Fig. 2 is a top plan view of the steering device. Fig. 3 is a front elevation of the steering device. Fig. 4 is a section taken on line 4—4 of Fig. 3. Figs. 5 and 6 are detail views of the swivel connection of the retaining rod between the respective land and furrow wheels.

Referring to the drawings, T designates the tractor, F the land side of the furrow and D the steering drum of the tractor.

The present steering or pilot device consists of a plate 1, the two brackets 2 and 3, and the lower plate 4 with the upper offset end 4ᶠ, these plates and brackets being connected together to constitute the main frame of the steering device.

Journaled in the ends of the plates 1 and 4 and the terminals of the bracket 2 is a vertical shaft 5, which carries upon its lower end at right angles thereto the stub axle 6, upon which is journaled the furrow wheel 7, said furrow wheel 7 being provided with the angular rim 7' and such rim being so mounted as to normally track with the wheels of the tractor but in advance thereof. Keyed upon the upper end of the vertical shaft 5 is a pulley 8, and also the arm 9, said arm 9 extending forwardly of the frame of the steering device. Journaled in the opposite terminals of the plates 1 and 4 and the bracket 3 is a vertical shaft 10, carrying upon its lower end the stub shaft 11, upon which is journaled the land wheel 12, whose stub axle, as clearly shown in Fig. 3, is in a horizontal plane above the horizontal plane of the stub axle 6 of the furrow wheel 7, this being done to permit the land wheel to engage the land while the furrow wheel enters the furrow and is held by the canting of the land wheel 12 outwardly, as indicated in Figs. 1 and 2, against the land side of the furrow. Keyed upon the upper end of the vertical shaft 10 is the arm 13 which is connected to the arm 9 by means of the connecting rod 14, the connecting rod 14, as clearly shown, thereby providing a means to transmit motion from the land wheel 12 to the furrow wheel 7, and vice versa.

Placed around the pulley 8 is a steering cable 15, which is led rearwardly to and around the steering drum D of the tractor, so that the steering movement of the respective wheels 7 and 12 will rotate the pulley 8 and through the cable 15 operate the drum D of the tractor and thus automatically actuate the steering mechanism of the tractor so that the attendant is freed from the necessity of steering the tractor during the plowing operation.

It will be noted that the land wheel rim or tire is a flat tire, but that the same is canted outwardly or out of parallel with the furrow wheel 7, and that therefore the tendency of such wheel is to pull upon the rod 14 and hold the furrow wheel 7 in engagement with the land side of the furrow, thus providing a means, even should the furrow wheel momentarily be thrown out of the furrow due to irregularities or other means, to return the same to the proper position for controlling the steering drum of the tractor.

Connected centrally of the lower plate, 4 of the front frame of the steering device, and extending rearwardly therefrom, is a connecting plate 16, which has disposed upon opposite sides thereof, the respective reach rods 17 and 18, which are connected to the plate 16 by means of the bolts 19 and 20 respectively, the bolt 20 also acting as a connecting means for the rear ends of the bracing plates 21, 22 and 23, which are connected respectively to the plate 1 and the brackets 2 and 3. These reach rods 17 and 18, as clearly shown in Figs. 2 and 3, extend rearwardly in divergent directions and are spaced at their rear ends by means of the cross bar 24. Connected to the respective terminals of the reach rods 17 and 18, are the pairs of spaced plates 25—25', which have pivotally connected therein the respective eye bolts 26—26', which are connected to the forward axle 27 of the tractor.

As shown in Figs. 5 and 6, the connection for the connecting rod 14 to the arm 13, consists of the block 28, provided with the pivoting stud 29 forming a swivel connection for the arm 13, while passing through the block 28 is the connecting rod 14 connected adjustably thereto by means of the nuts 30—30'.

From the foregoing description, taken in connection with the drawings it will be seen that the peculiar canting action of the land wheel 12, holds the wheel in non-tracking relation to the furrow engaging wheel 7, the stub shaft 11 being canted rearwardly and out of axial alinement with the stub shaft 6, so that the land wheel 12 will pull outwardly and away from the furrow engaging wheel 7 without the tendency to raise such furrow wheel 7 in a vertical position, as would be the case if the axle 11 were canted downwardly and out of the same horizontal plane with the axle 6 although in alinement as is often the case. This peculiar positioning of the land wheel 12 produces the desired action in the furrow wheel 7 to retain the furrow wheel 7 in engagement with the land side of the furrow at all times without any lifting action that would be occasioned if the stub shaft 11 were canted downwardly out of the horizontal plane instead of rearwardly as in the present instance. At the same time by positioning the land wheel so that the full rim thereof will rest upon the land, a better gripping surface for the desired action is afforded and both wheels 7 and 12 will assist each other in properly actuating the steering drum of the tractor.

By constructing the present device as shown and with the detachable eye bolts, the same may be readily attached to any form of tractor, so that the same is a steering attachment especially adapted for use in connection with plowing operations.

What is claimed is:

A steering attachment for tractors, including a frame composed of two spaced plates the lower terminal at one side of which is above the horizontal plane of the lower terminal at the opposite side, a vertical shaft journaled in each pair of terminals of the frame, a stub shaft mounted upon the lower end of each vertical shaft and limited in the upper movement by the under side of the frame, a furrow engaging wheel mounted upon the lowermost stub shaft, a land engaging wheel mounted upon the other stub shaft, an arm mounted upon the upper end of each of the respective vertical shafts, a connecting rod between the respective arms for maintaining the wheels out of tracking relation but for movement in unison, and means carried by one of the vertical shafts for connection with the steering mechanism of a tractor.

In testimony that I claim the foregoing as my own, I have hereto affixed my signature in the presence of two witnesses.

WILLIAM HENRY WATERMAN.

Witnesses:
E. C. WOLF,
G. L. STANT.